(12) United States Patent
Tsuchimoto

(10) Patent No.: US 10,048,857 B2
(45) Date of Patent: *Aug. 14, 2018

(54) SHARED SYSTEM AND TERMINAL DEVICE

(71) Applicant: TOSHIBA TEC KABUSHIKI KAISHA, Shinagawa-ku, Tokyo (JP)

(72) Inventor: Hiroshi Tsuchimoto, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/712,534

(22) Filed: Sep. 22, 2017

(65) Prior Publication Data
US 2018/0011618 A1  Jan. 11, 2018

Related U.S. Application Data

(63) Continuation of application No. 14/813,382, filed on Jul. 30, 2015, now Pat. No. 9,805,176.

(51) Int. Cl.
*G06F 3/0488* (2013.01)
*H04W 12/06* (2009.01)

(52) U.S. Cl.
CPC .. *G06F 3/0488* (2013.01); *G06F 2203/04803* (2013.01); *H04W 12/06* (2013.01)

(58) Field of Classification Search
None
See application file for complete search history.

(56) References Cited

U.S. PATENT DOCUMENTS

| 9,805,176 | B2 * | 10/2017 | Tsuchimoto ......... G06F 3/0488 |
| 2003/0107529 | A1 | 6/2003 | Hayhurst et al. |
| 2013/0127762 | A1 | 5/2013 | Tong |
| 2014/0354556 | A1 | 12/2014 | Alameh et al. |
| 2015/0116542 | A1 | 4/2015 | Lee |
| 2015/0120814 | A1 | 4/2015 | Son |
| 2015/0122879 | A1 | 5/2015 | Kawasato |
| 2015/0138121 | A1 | 5/2015 | Koenig et al. |
| 2015/0156557 | A1 | 6/2015 | Kang et al. |
| 2015/0287165 | A1 | 10/2015 | Berghoff |
| 2016/0117661 | A1 | 4/2016 | Tsuchimoto |

OTHER PUBLICATIONS

Non-Final Office Action for U.S. Appl. No. 14/813,382 dated Sep. 23, 2016.
Final Office Action for U.S. Appl. No. 14/813,382 dated Mar. 16, 2017.

* cited by examiner

*Primary Examiner* — James A Thompson
(74) *Attorney, Agent, or Firm* — Amin, Turocy & Watson LLP

(57) ABSTRACT

A shared system comprises a terminal device and a server. The terminal device comprises a display unit configured to segment a display area and display different contents in different segmented areas. The server receives, from the terminal device, the resolution information of a first segmented area which is one of the segmented areas of the terminal device, generates, according to the resolution information received, a screen on which data can be viewed or edited, and sends the screen in such a manner that the generates screen can be displayed in the first segmented area of the terminal device.

13 Claims, 7 Drawing Sheets

SHARED SYSTEM AND TERMINAL DEVICE

CROSS-REFERENCE TO RELATED APPLICATIONS

This application is a Continuation of application Ser. No. 14/813,382 filed Jul. 30, 2015, the entire contents of which are incorporated herein by reference.

FIELD

Embodiments described herein relate to a technology of conveniently sharing a terminal device arranged outdoors or in a shared space.

BACKGROUND

To view or edit an electronic personal document outdoors, people need to carry a notebook computer, a tablet PC, a smart phone and the like.

This causes problems that a computer or smart phone is taken as luggage and that it is unlikely to use a large screen.

DETAILED DESCRIPTION

In accordance with an embodiment, a shared system comprises a terminal device and a server. The terminal device comprises a display unit which segments a display area and displays different contents in different segmented areas. The server receives, from the terminal device, the resolution information of a first segmented area which is one of the segmented areas of the terminal device, generates, according to the resolution information received, a screen on which data can be viewed or edited, and sends the screen in such a manner that the generated screen is displayed in the first segmented area of the terminal device.

In accordance with an embodiment, a terminal device comprises a display unit, an interface unit and a control unit. The display unit segments a display area and displays different contents in different segmented areas. The interface unit communicates with the server. The control unit causes the interface unit to send the resolution information of a first segmented area which is one of the segmented areas and receive a screen which is generated by the server according to the resolution information and on which data can be viewed or edited and the first segmented area of the display unit to display the screen.

In an embodiment, a terminal device, for example, a digital signage apparatus or a desktop information processing apparatus with a large screen, which is rented outdoors or arranged in a shared space for a sharing purpose, is used as a personal desktop. The personal data of the user of the desktop (hereinafter referred to as a user) is stored in a management server in the cloud. A piece of application software for viewing and editing personal data runs in the management server, and a virtual desktop screen provided by the management server is displayed on the terminal device to receive an operation from the user.

The user segments the screen of the terminal device such as a desktop information processing apparatus or a signage apparatus just to obtain a needed area. Further, it is assumed that the terminal device is multiuser device which can be used by a plurality of people at the same time. The resolution of a segmented screen of the terminal device is acquired by the management server for a match with the resolution of a virtual desktop screen.

The management server stores the desktop state of each user. The management server stores the former desktop state of each user and redisplays the desktop state when the user logs in next time.

Embodiments of the present invention are described below with reference to accompanying drawings.

Figure 1:
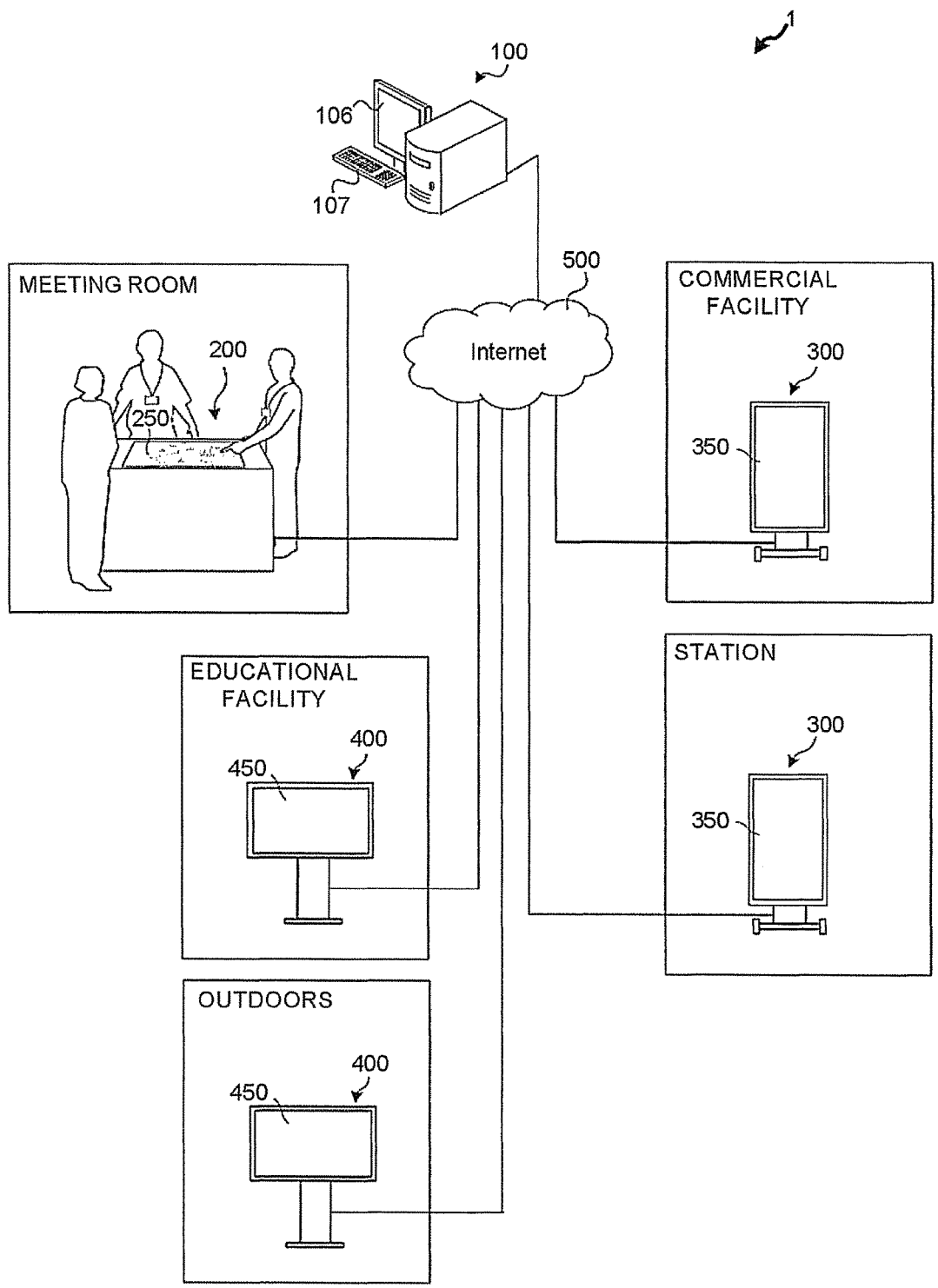
FIG. 1 is a diagram exemplifying the structure of a shared system according to an embodiment.

FIG. 1 is a diagram exemplifying the structure of a system according to an embodiment. A shared system 1 provides, on a desktop information processing apparatus 200 or a signage apparatus 300 or 400 located outdoors or in a shared space, a personal desktop for a user to view or edit personal data. As shown in the example of FIG. 1, the shared space refers to a commercial facility such as a shopping mall, a market and a theater (further including a sports facility such as a ball park), an educational facility such as a school, a library and a gallery or a station. The shared space further includes a facility where people have a meeting, such as the meeting room of an enterprise. The case shown in FIG. 1 is merely exemplary, and the shared space is where people get together.

The shared system 1 comprises a management server 100, a desktop information processing apparatus 200 and signage apparatuses 300 and 400, each of which is not limited in number or configuration position to that shown in FIG. 1. The management server 100 and each terminal device (the desktop information processing apparatus 200 and the signage apparatuses 300 and 400) are connected via the Internet 500 to transmit data with each other.

The management server 100 stores the data of the user capable of using each terminal device as a desktop. The management server 100 authenticates the login of a user by itself or an external device. Further, the management server 100 stores the desktop state of the user or the data of each user and sends the stored data to the desktop information processing apparatus 200 and the signage apparatuses 300 and 400 according to requirements from the desktop information processing apparatus 200 and the signage apparatuses 300 and 400.

The desktop information processing apparatus 200 is a computer which is deployed in, for example, in a meeting room or a conference place as a table. To be shared, the desktop information processing apparatus 200 has a large touch panel display 250 on the top surface. The user displays conference documents and images on the touch panel display 250 and participates in a meeting or conference by operating the touch panel display 250.

To share advertisement information with passages and other people, the signage apparatus 300 is a digital signage which has a large touch panel display 350 on the front side. The signage apparatus 400 is an apparatus which is different from the signage apparatus 300 in shape and which has a large touch panel display 450 on the front side. The signage apparatus 300 or 400 is also called dynamic signage, interactive signage or narrow-casting.

The touch panel displays 250, 350 and 450 segment a display area according to control signals from a control unit (processor) in the apparatus and display different contents in different segmented areas.

Figure 2:
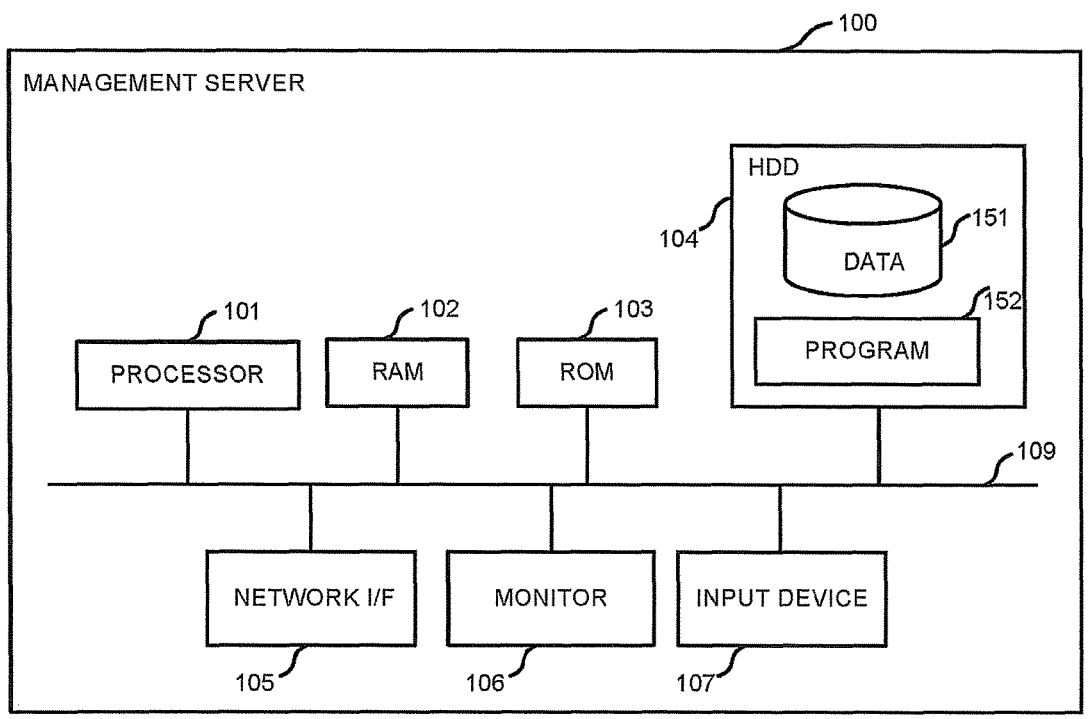
FIG. 2 is a block diagram exemplifying the structure of a management server according to an embodiment.

FIG. 2 is a block diagram exemplifying the structure of the management server 100. The management server 100 comprises a processor 101, a Random Access Memory (RAM) 102, a Read Only Memory (ROM) 103, a Hard Disk Drive (HDD) 104, a network Interface (I/F) 105, a monitor 106, an input device 107 and a bus line 109 for the input and the output of data among the units.

The processor 101 is a computing device such as a Central Processing Unit (CPU). The processor 101 develops the programs stored in the ROM 103 or the programs 152 stored in the HDD 104 in the RAM 102 and executes the programs, thereby providing various functions while cooperating with each piece of hardware. The RAM 102 is a primary memory device, and the ROM 103 is a non-volatile memory device for storing system programs.

The HDD 104 is an auxiliary non-volatile memory device for storing the programs 152 or the data 151 of each user.

The network I/F 105 is a communication device which controls the data communication with an external device according to various communication standards. The monitor 106 and the input device 107 are input/output devices which are used by the maintainer or user of the management server 100 and which display information (images) for the maintainer or user and receive an operation from the maintainer or user.

Figure 3:
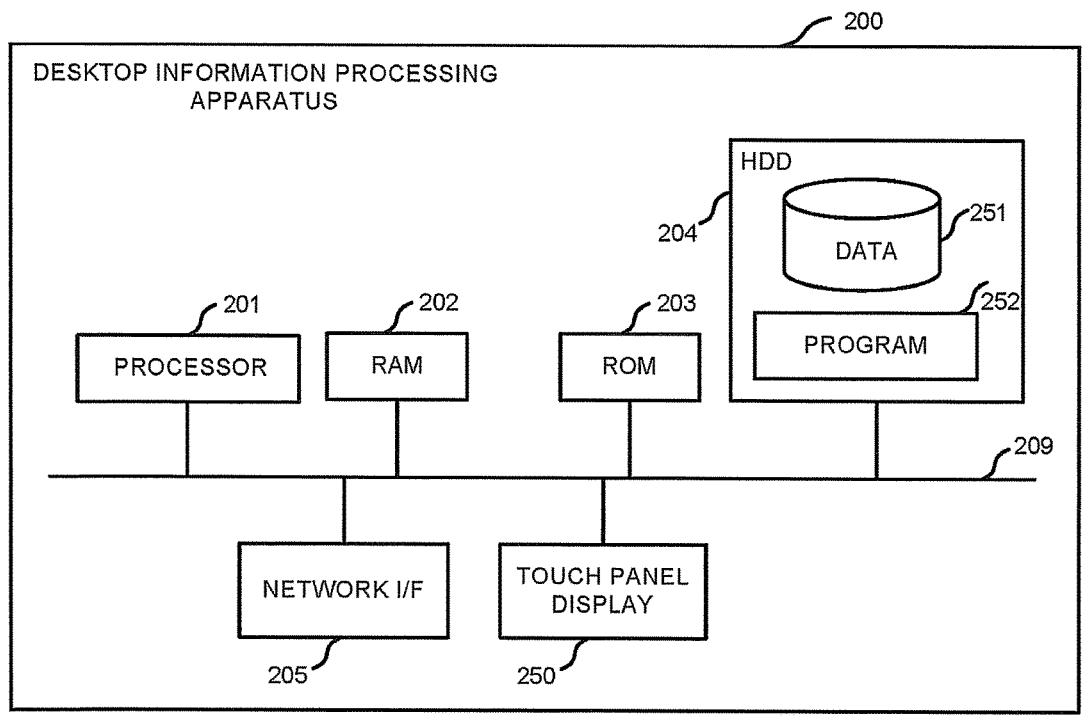
FIG. 3 is a block diagram exemplifying the structure of a shared desktop information processing apparatus according to an embodiment.

FIG. 3 is a block diagram exemplifying the structure of the desktop information processing apparatus 200. The desktop information processing apparatus 200 comprises a processor 201, an RAM 202, an ROM 203, an HDD 204, a network I/F 205 and a touch panel display 250.

The processor 201, the RAM 202, the ROM 203 and the network I/F 205 are identical to those of the foregoing management server 100. The HDD 204 is an auxiliary non-volatile memory in which the programs 252 or data 251 executed by the processor 201 are stored in advance.

The touch panel display 250 is formed by laminating a touch panel on a large liquid crystal display on the top surface of a table thereof.

Although located at a different position in the signage apparatus 300 or 400 as a hardware structure, the touch panel display is structurally identical to the desktop information processing apparatus 200 and is therefore not described here repeatedly. Further, the following description mainly targets the desktop information processing apparatus 200 except for that related to FIG. 5A and FIG. 5B, and the description on the desktop information processing apparatus 200 is applicable to the signage apparatuses 300 and 400.

Figure 4:
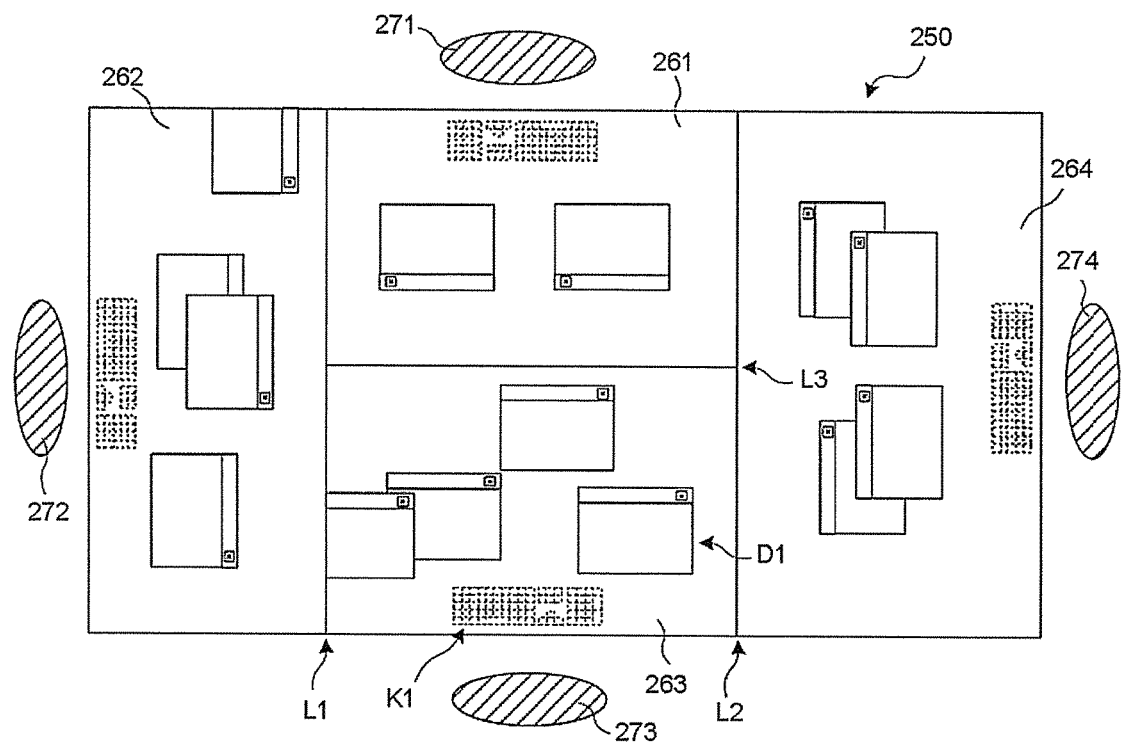
FIG. 4 is a diagram exemplifying the display on a desktop information processing apparatus, in which the position of a user is represented by a shadowed oval.

FIG. 4 is a diagram exemplifying the display on the touch panel display 250 of the desktop information processing apparatus 200, in which the position of a user is represented by a shadowed oval. The user of a desktop draws lines L1-L3 on the touch panel display 250 to segment the display area of the touch panel display 250. In the embodiment, the lines L1-L3, even if curved, can be straightened and adjusted to be parallel or vertical to the sides of the display area of the touch panel display 250. Further, when a segmented area is formed, the resolution of the segmented area (the numbers of the pixels in horizontal and vertical directions in the segmented area) is adjusted to a predefined resolution. The resolution, which is adjusted to '640*480' and '1024*768' in the following description, can be adjusted to various predetermined sizes, but not limited to '640*480' and '1024*768'. The adjustment on the line or resolution is realized through the execution of the programs 252 by the processor 201. As to the adjustment on resolution, the processor 201 adjusts the size of the segmented area created by the user to the nearest given size.

In the example shown in FIG. 4, the touch panel display 250 is segmented into four desktop areas 261-264; however, the segmented areas are not limited in number or shape to the example shown in FIG. 4. Each user views personal documents or images on a window screen D1 in a desktop formed in one of the areas 261-264 and edits the personal documents or images using a soft keyboard K1. Further, the user browses Webpage and receives or sends an e-mail through the window screen D1. Under the control of the processor 201, the areas 261-264 are separated by taking the lines L1-13 as borders, and the window screen D1 in an area cannot enter another area.

Further, in order not to be recognized by other people except for the user, the processor 201 carries out a light polarization processing to narrow the view range of each area, which is a conventional technology. The recognition in which direction is allowed or not allowed is determined according to the coordinates of the centre-of-gravity position of a desktop area. For example, in the example shown in FIG. 4, the centre-of-gravity position of the area 261 is above the paper surface shown in FIG. 4, thus, the recognition from above the paper surface shown in FIG. 4 (position 271) is allowed, and the recognition from other directions is prevented. The centre-of-gravity position of the area 262 is on the left of the paper surface shown in FIG. 4, thus, the recognition from the left side of the paper surface shown in FIG. 4 (position 272) is allowed, and the recognition from other directions is prevented. The centre-of-gravity position of the area 263 is below the paper surface shown in FIG. 4, thus, the recognition from below the paper surface shown in FIG. 4 (position 273) is allowed, and the recognition from other directions is prevented. The centre-of-gravity position of the area 264 is on the right of the paper surface shown in FIG. 4, thus, the recognition from the right side of the paper surface shown in FIG. 4 (position 274) is allowed, and the recognition from other directions is prevented.

Further, as shown in FIG. 4, in each of the areas 261-264, a desktop is rotated and displayed in a given direction with respect to the position (positions 271-274) of the user of the desktop. Like the light polarization processing, towards which direction a desktop is displayed is determined according to the centre-of-gravity position of an area.

Figure 5A:
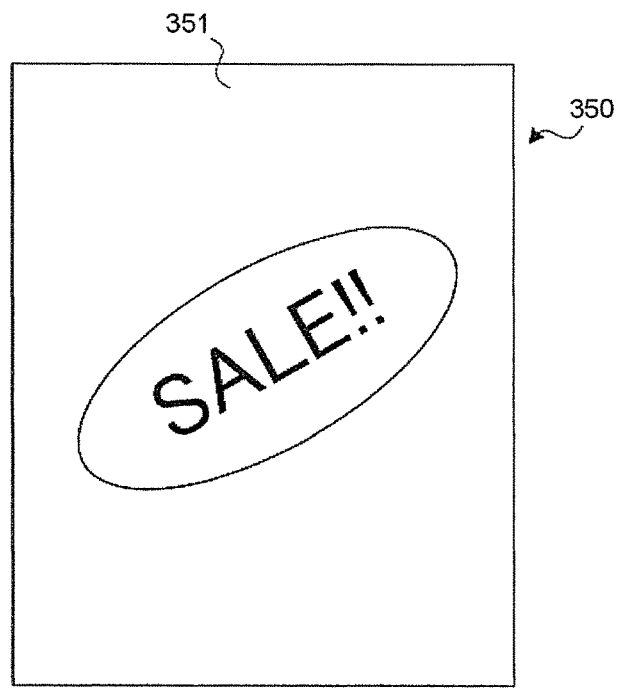
FIGS. 5A and 5B are a diagram exemplifying the display on a signage apparatus.
Figure 5B:
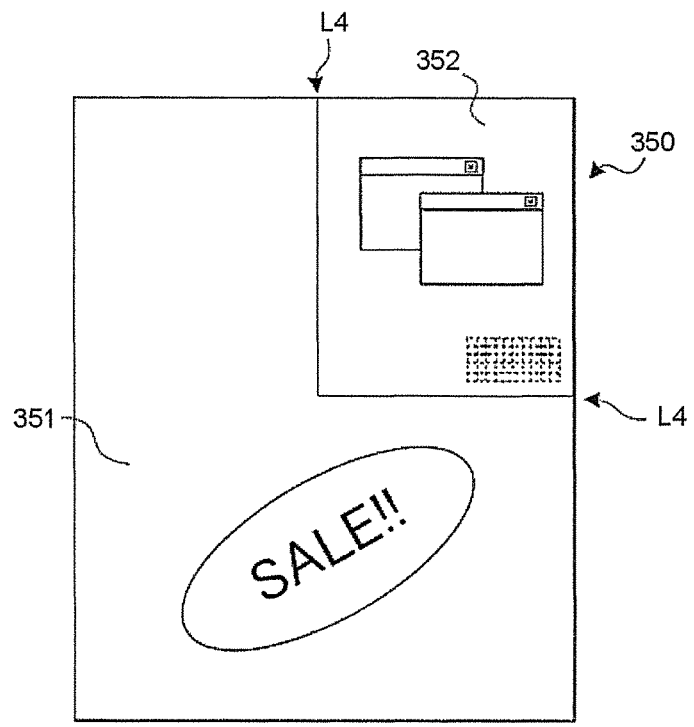

FIGS. 5A and 5B are a diagram exemplifying the display on the signage apparatus 300. The signage apparatus 300 is mainly used as an event or commodity information notification medium, thus, an advertisement image 351 is usually displayed in the whole display area, as shown in FIG. 5A. As shown in FIG. 5B, by drawing an L-shape line L4 on a touch panel display 350, a desktop user generates a desktop area 352 on the signage apparatus 300. The signage apparatus 300 allows the recognition from the left or right side of the centre-of-gravity position of a desktop area and carries out a light polarization processing for preventing the recognition from other directions. Further, the line L4, even if curved, can be straightened and adjusted to be parallel or vertical to the sides of the display area of the touch panel display 350.

Further, when a segmented area is formed, the resolution of the segmented area (the numbers of the pixels in horizontal and vertical directions in the segmented area) is adjusted to a predefined resolution. Further, the signage apparatus 300 scales down the advertisement image 351 so that the whole advertisement image 351 is displayed on the touch panel display 350 without being overlapped with the area 352. The line or resolution is adjusted and the size of the advertisement image 351 is changed through the execution of programs by a processor in the signage apparatus 300.

Figure 6:
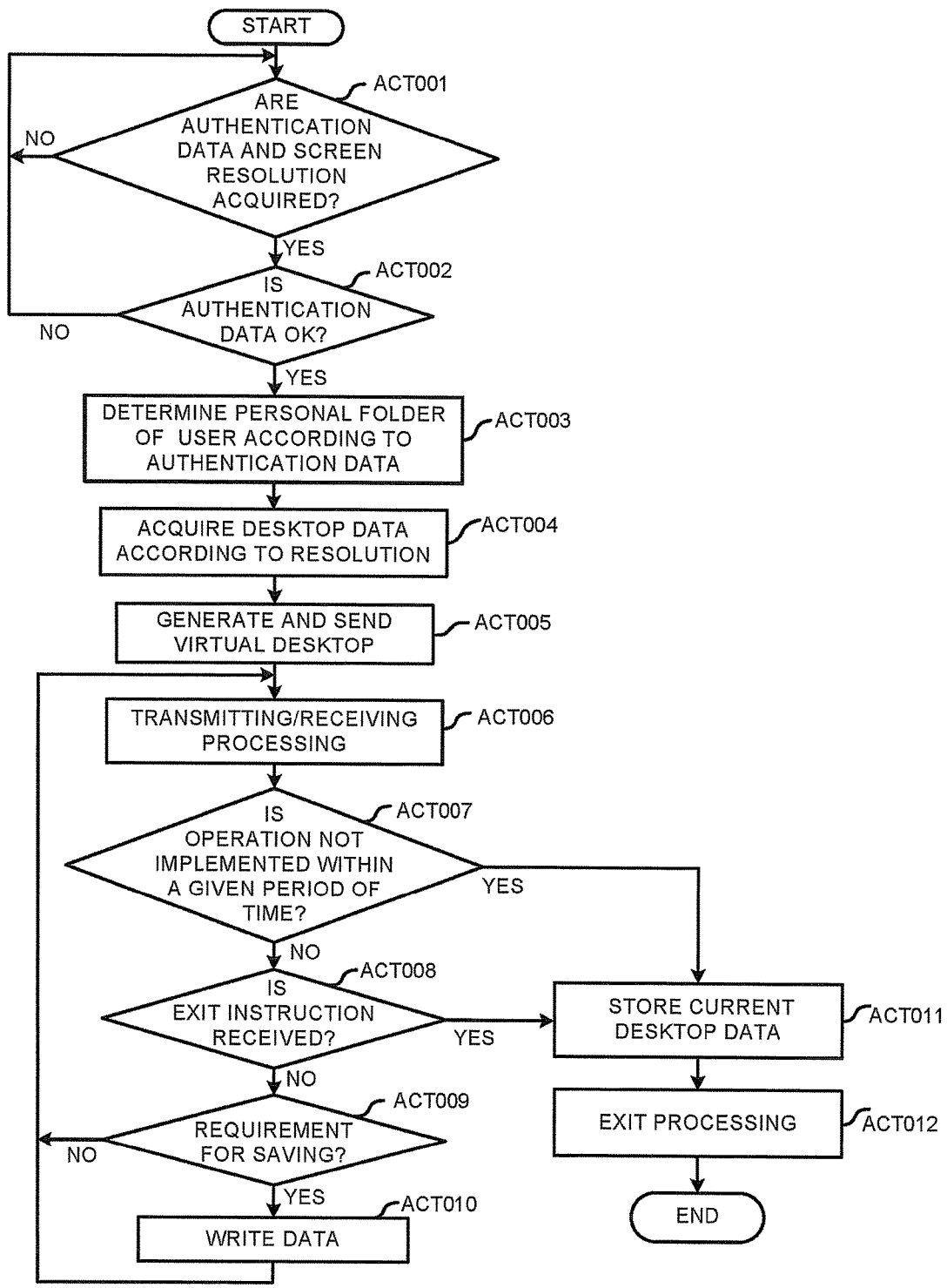
FIG. 6 is a flowchart exemplifying the actions of a management server.
Figure 7:
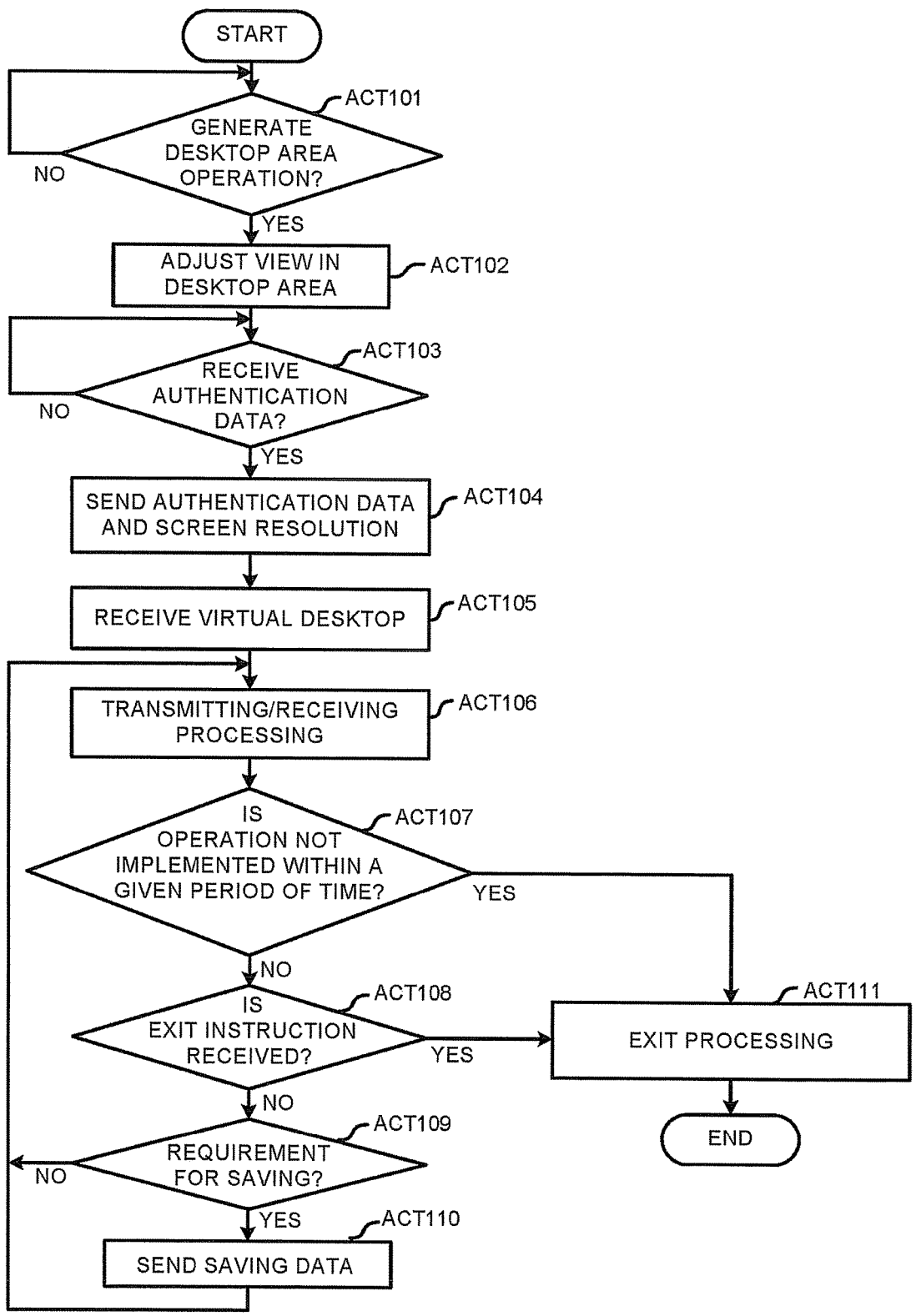
FIG. 7 is a flowchart exemplifying the actions of a terminal device.

Actions of the shared system 1 are exemplarily described below with reference to FIG. 6 and FIG. 7. First, Actions of the management server 100 are exemplarily described with reference to the flowchart of FIG. 6. The flowchart of FIG. 6 shows the actions carried out by the processor 101 by developing the programs 152 or the data 151 which are imported in the HDD 104 in advance in the RAM 102 and then executing the programs 152. Further, in the example, the desktop information processing apparatus 200 is illustrated as a terminal device; however, the terminal device may also be the signage apparatus 300 or 400.

The processor 101 stands by until authentication data and screen resolution are acquired from the desktop information processing apparatus 200 via the network I/F 105 (Act 001: Loop of No). In the example, the authentication data refers to a set of user ID and password (or data generated based on a password) or any biometric authentication information that can be used to confirm the information of a user. Further, the screen resolution refers to the resolution of an area segmented by the user for use as a desktop, and in the example, as stated above, the screen resolution refers to the numbers of the pixels in horizontal and vertical directions in a segmented area, such as '640*480' or '1024*768'.

If authentication data is acquired via the network I/F 105 (Act 001: Yes), the processor 101 determines whether or not the authentication data is accordant with pre-registered data (Act 002). If the authentication data is not accordant with the pre-registered data (Act 002: No), the flow returns to Act 001, otherwise (Act 002: Yes), the processor 101 determines the personal folder of the user according to the authentication data (Act 003). A folder named the user ID of a user is formed in the HDD 104 in advance for each user, the personal data of a user, including file data, static image data and dynamic image data, or data defining the current desktop state (hereinafter referred to as desktop data), is stored in the folder. The desktop data is also composed of, for example, sub-folders corresponding to resolutions named '640*480', '1024*768' and the like. Icon data suitable for a resolution or the image data of a soft keyboard K1 suitable or the resolution is stored in the sub-folder. The processor 101 determines the sub-folder corresponding to the screen resolution sent with the authentication data and acquires the data in a specific sub-folder from the HDD 104 (Act 004).

The processor 101 generates desktop image data (referred to as a virtual desktop) with the desktop data acquired and controls the network I/F 105 to send the virtual desktop to the desktop information processing apparatus 200 (Act 005).

Then, data is transmitted between the management server 100 and the desktop information processing apparatus 200 every time the user operates the desktop information processing apparatus 200 (Act 006).

Here, the processor 101 determines whether or not an operation is not carried out within a given period of time, that is, determines whether or not the sending or receiving of data shown in Act 006 is not implemented within a given period of time (Act 007). If an operation is carried out within the given period of time (Act 007: No), the processor 101 determines whether or not an exit instruction is received which is given through a specific operation of the user (Act 008). If no exit instruction is received (Act 008: No), the processor 101 determines whether or not there is a requirement for the saving of the data updated by the user (Act 009). If there is a requirement for the saving of the data updated by the user (Act 009: Yes), the processor 101 writes the data or updates the writing of the data (Act 010), then the flow returns to Act 006. If there is no requirement for the saving of the data updated by the user (Act 009: No), the processor 101 returns to execute Act 006.

On the other hand, if no operation is carried out within the given period of time (Act 007: Yes) or an exit instruction is received (Act 008: Yes), the processor 101 stores the current desktop data (Act 011). When the configured coordinates of an icon, the file name or the page of an opened document, the size of the window screen D1 and the angle of the window screen D1 in a desktop are changed, the angle of the configured coordinates are included in the data stored as desktop data. In this case, the processor 101 also updates the sub-folders named other resolutions which are not used in the current processing as the current desktop data. An exit processing is executed (Act 012) after Act 011 is executed.

Next, actions of the desktop information processing apparatus 200 serving as a terminal device are exemplarily described with reference to FIG. 7. The flowchart of FIG. 7 shows the actions carried out by the processor 201 by developing the programs 252 or the data 251 which are imported in the HDD 204 in advance in the RAM 202 and then executing the programs 252.

The processor 201 determines whether or not there is an operation of generating a desktop area (Act 101). Here, the user draws lines or a circle with a fingertip on the touch panel display 250 to generate a closed segmented area. Further, when segmenting the display area of the touch panel display 250, the user touches, with a fingertip or a pen, a segmented area to designate the segmented area as a desktop area. The operation of generating a desktop area refers to a series of operations in this example.

The processor 201 adjusts the view in the desktop area using the conventional technology (Act 102).

The processor 201 displays an authentication data input screen in the generated desktop area to receive authentication data (Act 103). Here, the processor 201 receives the input of a login ID and a login password via the touch panel display 250. After receiving the authentication data (Act 103: Yes), the processor 201 sends the information to the management server 100, further, the processor 201 sends the adjusted resolution (the numbers of the pixels in horizontal and vertical directions in the segmented area) of the generated desktop area to the management server 100 (Act 104). Further, after the sent pixel size is adjusted to a specific value such as '640*480' or '1024*768', the adjusted pixel size is sent to the management server 100, as stated above.

If the authentication is matched, the processor 201 controls the network I/F 205 to receive a virtual desktop generated by the management server 100 (Act 105).

Then, data is transmitted between the management server 100 and the desktop information processing apparatus 200 every time the user operates the touch panel display 250 (Act 106).

If no operation is carried out within a given period of time (Act 107: Yes) or an exit operation is executed (Act 108: Yes), the processor 201 cuts off the session with the management server 100 and carries out an exit processing of exiting the desktop information processing apparatus 200 (Act 111). The exit processing further includes a processing of completely erasing the used data from the desktop information processing apparatus 200. For example, as a data erasing processing, the working area used in the desktop of the RAM 202 is reset to a random value or 0 and released, or the data temporarily written in the HDD 204 is reset to a random value or 0.

On the other hand, if an operation is carried out by the user within the given period of time (Act 107: No) or no exit instruction is received (Act 108: No), the processor 201 determines whether or not a requirement of saving the edited data or the reproduced data is received from the user (Act 109). If there is no saving requirement (Act 109: No), the processor 201 returns to execute Act 106. If there is a saving requirement (Act 109: Yes), the processor 201 controls the network I/F 205 to send the saved data to the management server 100 (Act 110), and the flow returns to Act 106. Act 110 is an action of preventing the saving of the personal data of the user in the desktop information processing apparatus 200.

In the embodiment, resolution is adjusted by a terminal device, and the adjusted resolution is sent to the management server 100, however, the resolution adjustment may also be carried out by the management server 100. Further, in the embodiment, a designated resolution is adjusted by the user to a specific resolution; however, in order to be matched with the designated resolution, the image displayed on the virtual desktop operated by a user may be scaled up or down. In this case, the image displayed on the virtual desktop is scaled up or down by the management server 100.

In the foregoing example, a real-time exit processing is carried out after a given period of time, alternatively, an exit warning is given to the user, a timer is reset when an operation is continued, and the user is forced to log out after a given period of time when an operation is not continued.

Further, an additional function may be provided by means of which when the user prints a document, a printer on a network connected with the operated nearby terminal device can be automatically extracted for the user to make a choice.

Further, a sensor may be set for a seat nearby the terminal device to detect the stand-up of the user from the seat.

In accordance with embodiments of the present invention, the screen of the desktop used has a suitable resolution, thus providing a clear image for the user. Further, a plurality of desktop states may be stored so that a desktop state is selected and restored when a user logs in.

Further, the desktop state formerly edited using another terminal device is stored in the management server when the user logs out so that the desktop state can be regenerated when the terminal device is used again, thereby guaranteeing the same consistency in the use of the same terminal.

The terminal device is equivalent to the desktop information processing apparatus 200 and the signage apparatuses 300 and 400 of embodiments of the present invention.

In each foregoing embodiment, the functions for realizing each embodiment are pre-stored in an apparatus, however, the present invention is not limited to this, the same functions may also be downloaded from a network, or an element equipped with a memory medium in which the same functions are stored may be installed an apparatus. The memory medium may be any memory medium of any form that is capable of storing programs in a CD-ROM and is readable to an apparatus. Further, the functions achieved by an installed or downloaded program can also be achieved through the cooperation with an OS (Operating System) in an apparatus.

According to the present invention, personal data can be viewed and edited outdoors.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A method, comprising:
   segmenting a display area and display different contents in respective different segmented areas;
   identifying lines drawn in a touch panel by a user;
   modifying each of the lines to be a straight line that is substantially parallel to a side of the display area to yield modified lines;
   designating a first segmented area of the segmented areas based on the modified lines;
   controlling communication with a server; and
   sending resolution information indicating a size of the first segmented area designated by the modified lines;
   receiving a desktop screen generated by the server according to the resolution information and the first segmented area; and
   displaying the desktop screen displaying and facilitating editing of data.

2. The method according to claim 1, wherein a terminal device is arranged outdoors or in a space to be shared.

3. The method according to claim 1, further comprising:
   in response to determining that no operation is carried out on the desktop screen within a period of time, executing an exit processing on the desktop screen.

4. The method according to claim 1, further comprising:
   modifying the size of the first segmented area to conform to a specified size and sending, as the resolution information, an indication of a resolution of the modified size.

5. The method according to claim 1, further comprising:
   adjusting each of the lines to be parallel or vertical to the sides of the display area.

6. The method according to claim 1, further comprising:
   carrying out a light polarization processing to narrow the view range of the first segmented area.

7. The method according to claim 1, further comprising:
   rotating the first segmented area in a given direction with respect to the position of the user.

8. A shared system, comprising:
   a terminal device comprising a display unit configured to segment a display area and display different contents in respective different segmented areas, the terminal device further comprising a touch panel arranged on the display unit, and the display unit is configured to identify lines drawn on the touch panel by a user, modify each of the lines to be a straight line that is substantially parallel to a side of the display area to yield modified lines, define a first segmented area of the segmented areas based on the modified lines, and generate resolution information indicating a size of the first segmented area, and the display unit is configured to adjust each of the lines to be parallel or vertical to the sides of the display area; and
   a server configured to receive, from the terminal device, the resolution information of the first segmented area, to generate, according to the resolution information, a desktop screen on which data is at least one of displayed or edited, and to cause the desktop screen to be displayed in the first segmented area of the terminal device.

9. The shared system according to claim 8, wherein the terminal device is configured to carry out a light polarization processing to narrow the view range of the first segmented area.

10. The shared system according to claim. 8, wherein the terminal device is configured to rotate the first segmented area in a given direction with respect to the position of the user.

11. A terminal device, comprising:
a display unit configured to segment a display area and display different contents in respective different segmented areas;
a touch panel arranged on the display unit and configured to:
identify lines drawn in the touch panel by a user,
modify each of the lines to be a straight line that is substantially parallel to a side of the display area to yield modified lines,
adjust each of the lines to be parallel or vertical to the sides of the display area, and
designate a first segmented area of the segmented areas based on the modified lines;
an interface unit configured to control communication with a server; and
a control unit configured to cause the interface unit to send resolution information indicating a size of the first segmented area designated by the modified lines, to receive a desktop screen generated by the server according to the resolution information and the first segmented area, and to display the desktop screen, wherein the desktop screen is configured to display and facilitate editing of data.

12. The terminal device according to claim 11, wherein the terminal device is configured to carry out a light polarization processing to narrow the view range of the first segmented area.

13. The terminal device according to claim 11, wherein the terminal device is configured to rotate the first segmented area in a given direction with respect to the position of the user.

* * * * *